United States Patent [19]

Ryouki

[11] Patent Number: 4,727,496

[45] Date of Patent: Feb. 23, 1988

[54] SHAPE INPUTTING SYSTEM IN AUTOMATIC PROGRAMMING FUNCTION

[75] Inventor: Masato Ryouki, Aichi, Japan

[73] Assignee: Kabushiki Kaisha Okuma Tekkosho, Nagoya, Japan

[21] Appl. No.: 760,505

[22] Filed: Jul. 30, 1985

Related U.S. Application Data

[63] Continuation-in-part of Ser. No. 710,713, Mar. 11, 1985, abandoned.

[30] Foreign Application Priority Data

Mar. 13, 1984 [JP] Japan .................................. 59-48774

[51] Int. Cl.⁴ .............................................. G06F 15/40
[52] U.S. Cl. ..................................... 364/518; 340/709; 340/711; 364/474
[58] Field of Search .................................. 364/518–521, 364/474; 340/706, 709, 711, 723, 710

[56] References Cited

U.S. PATENT DOCUMENTS

| 4,275,449 | 6/1981 | Aish | 364/518 |
| 4,490,781 | 12/1984 | Kishi et al. | 364/147 |
| 4,510,568 | 4/1985 | Kishi et al. | 364/521 |
| 4,622,641 | 11/1986 | Stephens | 364/518 |

FOREIGN PATENT DOCUMENTS

56-047834  4/1981  Japan .................................. 364/518

Primary Examiner—Errol A. Krass
Assistant Examiner—Brian M. Mattson
Attorney, Agent, or Firm—Wenderoth, Lind & Ponack

[57] ABSTRACT

A graphics, such as a shop drawing of a workpiece worked by a machine tool, is inputted as working data in an automatic programming function in accordance with the natural graphic recognition order for an operator, and the system therefor includes the steps of first designating the shape of a basic graphics of the workpiece, and then designating sizes of the basic graphics, and finally designating the shape and sizes of auxiliary graphics of the workpiece.

3 Claims, 14 Drawing Figures

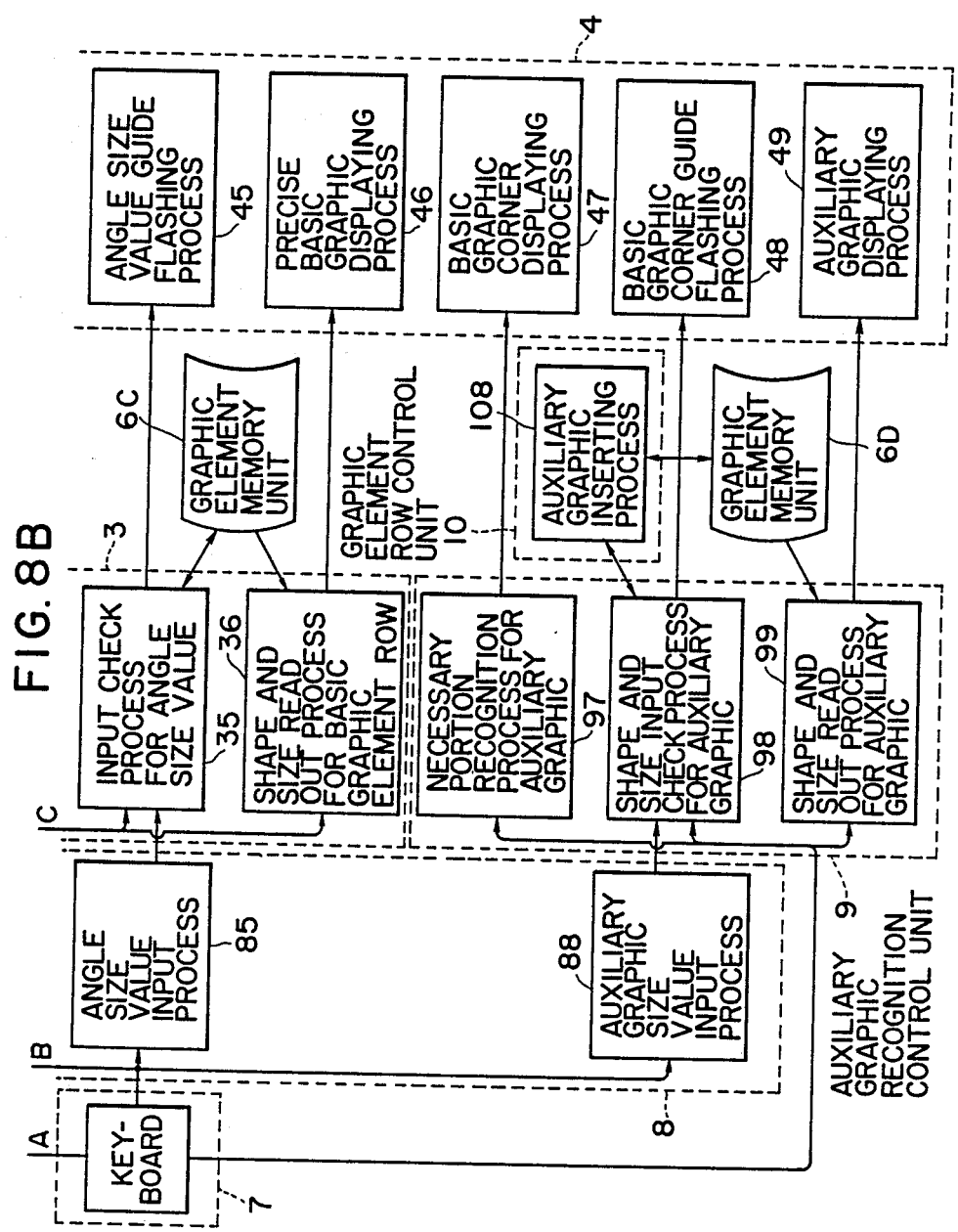

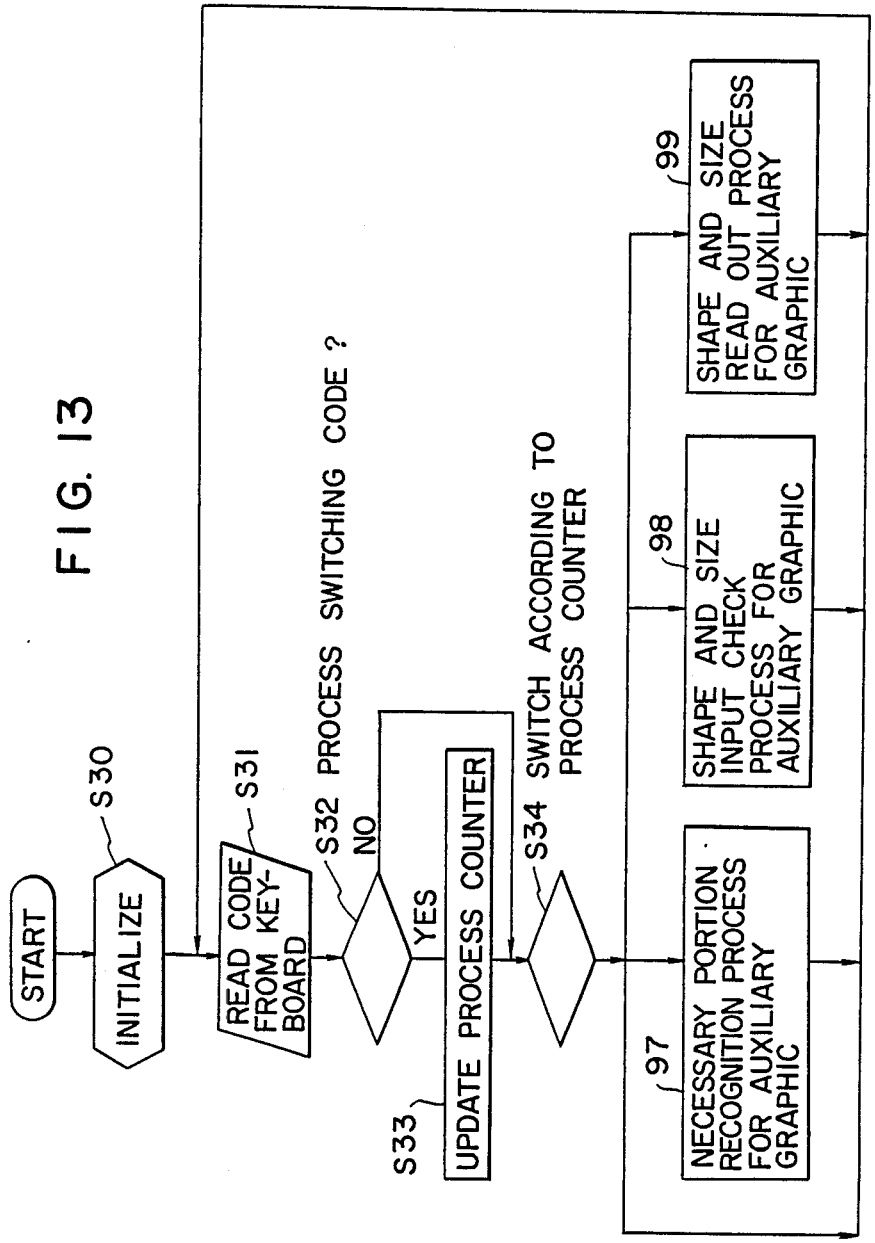

SHAPE INPUTTING SYSTEM IN AUTOMATIC PROGRAMMING FUNCTION

CROSS-REFERENCE TO RELATED APPLICATION

This application is a continuation in part of our prior application Ser. No. 710,713, filed on Mar. 11, 1985, entitled "SHAPE INPUTTING SYSTEM IN AUTOMATIC PROGRAMMING FUNCTION", and now abandoned.

BACKGROUND OF THE INVENTION

1. Field of the Invention

This invention relates to a shape inputting system in an automatic programming function particularly suitable for graphic recognition processing.

2. Description of the Prior Art

Generally, in a case where it is necessary to convert shop drawings of a workpiece such as working data of a numerical control (NC) machine tool into digital data or to deal with graphics including portions to be changed or amended, it is convenient to utilize an automatic plotting system, i.e. a system in which graphic forming programs are stored in a computer and an operator describes graphics in an interactive process with the computer while viewing the drawing.

In a conventional automatic plotting system, the shape inputting method is performed by the steps of dividing a shape pattern into shape elements and inputting names applied to the respective shape elements together with numerical values corresponding to the respective names to define the shapes in order. However, in the conventional method of the type described above, a shape of a rough graphic of the object to be worked is first recognized as the order for the operator to recognize the graphic of the workpiece, main sizes of the basic graphics, such as longitudinal lines, end surface lines tapered angles are then read out, and the presence, the shape and size of auxiliary graphics, such as C-face and R-face chamferings of details of the graphics are finally recognized. The rough graphic is referred to as "a basic".

As will be understood from the above, the shape inputting method for the conventional automatic plotting system is quite different from the natural graphic recognition order for the operator, so that the conventional shape inputting operation is not smoothly carried out, thus requiring much time and labor.

SUMMARY OF THE INVENTION

An object of this invention is to eliminate defects or problems in a prior art technique and to provide an improved system for inputting a shape, for example, working data of a workpiece for a machine tool, in an automatic programming function, capable of inputting the shape in accordance with the natural recognition order for operators.

According to this invention, for achieving this and other objects, there is provided a system for inputting a shape, for example, working data of a workpiece for a machine tool, in an automatic programming function, wherein the shape of a basic graphic of the workpiece is first designated, sizes of the basic graphics are then designated, and shapes and sizes of an auxiliary graphics of the workpiece are finally designated.

The nature, principle and utility of the invention will become more apparent from the following detailed description when read in conjunction with the accompanying drawings.

BRIEF DESCRIPTION OF THE DRAWINGS

In the accompanying drawings:

FIGS. 8A and 8B are block diagrams showing the detailed construction of the apparatus in FIG. 1;

FIG. 13 is a flowchart showing the operation of the auxiliary graphic recognition control unit 9.

DESCRIPTION OF THE PREFERRED EMBODIMENT

Figure 1:
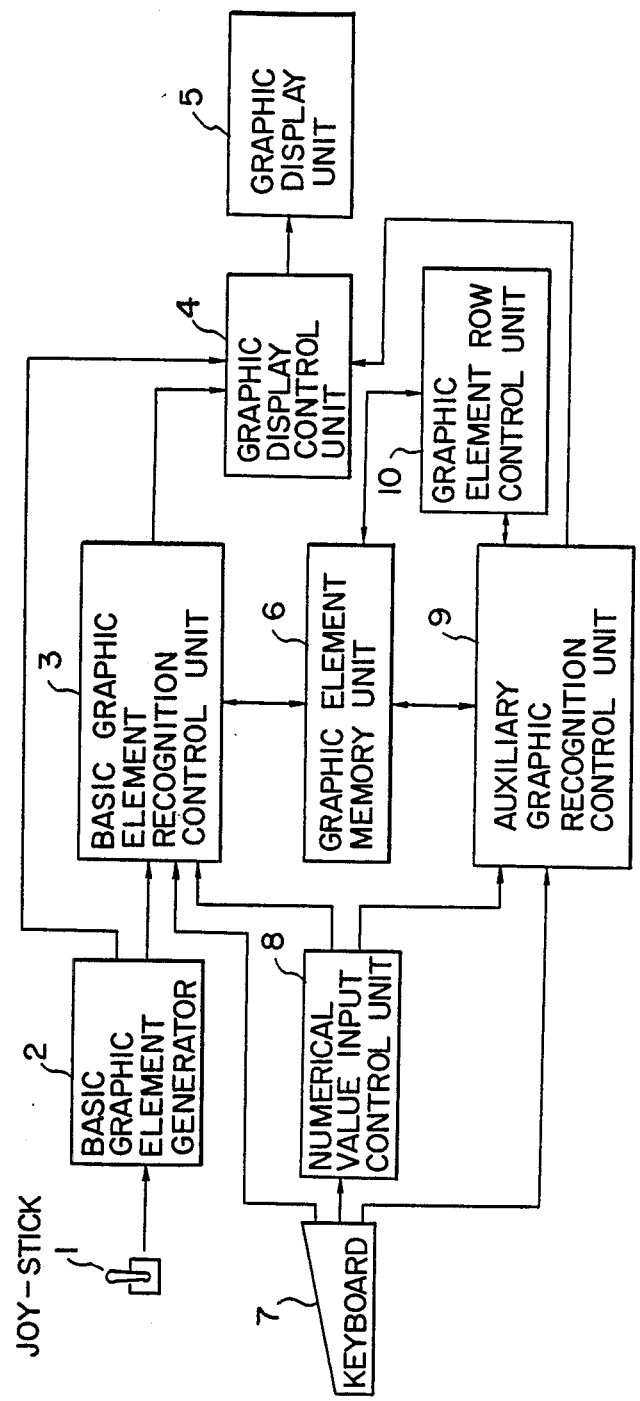
FIG. 1 is a brief diagramatic view of an apparatus to which the system according to this invention is applied.

FIG. 1 is a schematic diagram of an apparatus to which the system according to this invention is applied, and referring to FIG. 1, a basic graphic element generator 2 acts to generate elements of the basic graphics, such as longitudinal lines, end face lines, tapered angles and the like and to select the kind or type of the elements of the basic graphics generated by a joy-stick 1. Signals regarding the elements of the basic graphics transmitted from the basic graphic element generator 2 are inputted into a graphic display control unit 4 to display them on a graphic display unit 5 comprising, for example, a cathode ray tube (CRT), and are also inputted into a basic graphic element recognition control unit 3 to compose basic graphic element rows, which is then stored in a graphic element memory unit 6.

The basic graphic element recognition control unit 3 operates to recognize the size values of the necessary portions for confirming the basic graphics and to transfer these numerical values to the graphic display control unit 4, whereby the size lines are displayed on the graphic display unit 5. The size values inputted from a keyboard 7 by the operator are inputted through a numerical value input control unit 8 into the basic graphic element recognition control unit 3, where the values are checked, and thereafter the values are stored in the graphic element memory unit 6.

An auxiliary graphic recognition control unit 9 acts to read out the basic graphic element rows stored in the graphic element memory unit 6, to recognize necessary portions for designating the auxiliary graphics, and to transfer these portions to the graphic display control unit 4, to thereby display the designated necessary portions on the graphic display unit 5. When the shapes and sizes of the auxiliary graphics are inputted from the keyboard 7 on the basis of the thus obtained display, information regarding this display is inputted into the auxiliary graphic recognition control unit 9 and then checked. Thereafter, the checked information is controlled by a graphic element row control unit 10 and then inserted into necessary portions between the basic graphic element rows stored in the graphic element memory unit 6.

Figure 2:
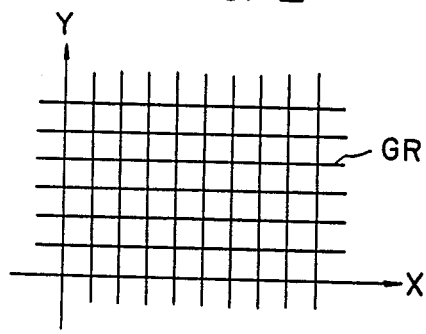
FIGS. 2 through 7 are representations for showing changes of graphics to be displayed on a graphic display unit of the apparatus shown in FIG. 1 in accordance with the system of this invention.

Using the apparatus constructed as shown in FIG. 1, when the apparatus starts to input the shape of a workpiece, reference lines X and Y and grids GR are displayed on the graphic display unit 5 as shown in FIG. 2 for the sake of easily describing or plotting the graphics using the instructions from the graphic display control unit 4. The basic graphic elements are generated from the basic graphic element generator 2 by the operator's control of the joy-stick 1 with reference to the displayed reference lines X and Y and the grids GR, and the basic graphic elements inputted into the basic graphic element recognition control unit 3 are displayed on the graphic display unit 5 through the graphic display control unit 4. Then, the operator sequentially inputs a series of basic graphic elements in a manner similar to one stroke that of a brush as shown by the arrows in FIG. 3 while observing the graphics displayed on the graphic display unit 5 and confirming the control direction of the joy-stick 1. When it is necessary to amend or correct the displayed graphics or shape, the graphics or shape is erased by following the displayed shape in a direction reverse to that shown by arrows in FIG. 3. After the erasure of the correcting portions, the basic graphic elements are again inputted in accordance with the the arrowed direction. The basic graphic elements are inputted into the basic graphic element recognition control unit 3, in which the basic graphic elements are then composed and the thus composed element rows are stored in the graphic element memory unit 6.

Figure 4:
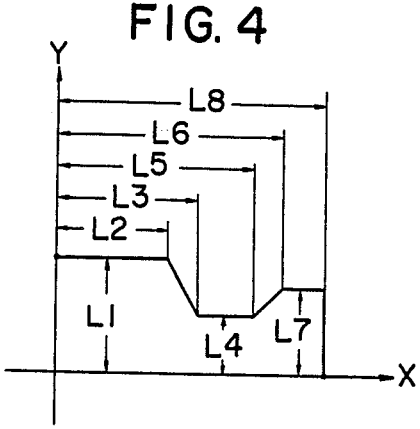
Figure 5:
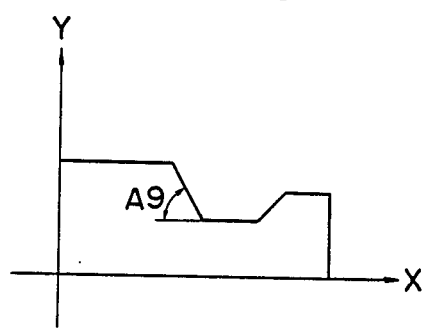

At the next step, the basic graphic element recognition control unit 3 recognizes the necessary portions of the numerical values of the size for determining the basic graphics and the recognized values are then transferred to the graphic display control unit 4 through which size lines are displayed of the graphic display unit 5 as shown in FIG. 4, for example. At this time, the graphic display control unit 4 operates to flash the size value describing portions of the size lines L1-L8 shown in FIG. 4 in accordance with the numerical orders to cause the operator to input the numerical values of the size lines L1-L8. In accordance with the flashing of these portions, when the size values are inputted from the keyboard 7 by the operator, the size values are inputted into the basic graphic element recognition control unit 3 through the numerical value input control unit 8 and checked therein. If the result of the checking is "OK", the numerical values are stored in the graphic element memory unit 6 together with the basic graphic element rows, but in case of "NO", the operator is urged to again input the correct size values. At the numerical value inputting operation, when an unclear size is located, the operator can input the question mark "?" meaning "not clear" from the keyboard 7, and in this case the operator is urged to input information regarding angles for determining the basic graphics by the basic graphic element recognition control unit 3 because it is impossible to confirm the basic graphics only with the size of the straight line. For example, when the question mark "?" is inputted with respect to the line L2 in FIG. 4, the operator is urged to input the angle "A9" as shown in FIG. 5, and when the numerical value of the angle "A9" is inputted from the keyboard 7 by the operator, the information of the numerical value regarding this angle "A9" is inputted into the basic graphic element recognition control unit 3 through the numerical value input control unit 8 and checked therein, and thereafter is stored in the graphic element memory unit 6 as described hereinbefore. As set forth before, after the shape and sizes have been determined, the shape and sizes of the basic graphic element rows are read out from the graphic element memory unit 6 by the basic graphic element recognition control unit 3 and transferred to the graphic display control unit 4, through which the correct graphic is then displayed on the graphic display unit 5.

Figure 6:
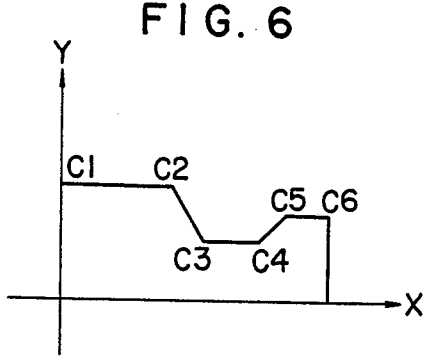

After the completion of the display of the basic graphics on the graphic display unit 5, the basic graphic element rows stored in the graphic element memory unit 6 are read out by the auxiliary graphic recognition control unit 9, and intersection portions of the respective basic graphic elements, i.e. portions to which the designation of the auxiliary graphics, such as showing C-face chamfering, and R-face chamfering is required are confirmed or recognized. The portions are then transferred to the graphic display control unit 4 and the portions represented by characters C1-C6, for example, in FIG. 6 are displayed on the graphic display unit 5. In accordance with the displayed graphics, information regarding the shapes and sizes of the auxiliary graphics are inputted from the keyboard 7 into the auxiliary graphic recognition control unit 9 and checked therein. If the result of the checking is "NO", the operator is urged to again input information regarding suitable numerical values of the size, and otherwise, when the result of the checking is "OK", the data regarding the auxiliary graphics is controlled by the graphic element row control unit 10 and inserted into suitable portions between the basic graphic element rows stored beforehand in the graphic element memory unit 6.

Figure 7:
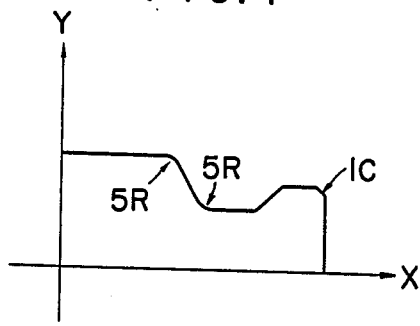

After the shapes and sizes of the auxiliary graphics have been completed by the manner described above, the auxiliary graphics are read out from the graphic element memory unit 6 by the auxiliary graphic recognition control unit 9 and then transferred to the graphic display control unit 4, through which the finally confirmed shapes of the graphics are displayed on the graphic display unit 5 as shown in FIG. 7, thus completing the shape inputting procedures.

This invention will now be described in detail referring to FIGS. 8A and 8B through 13.

Figure 8A:
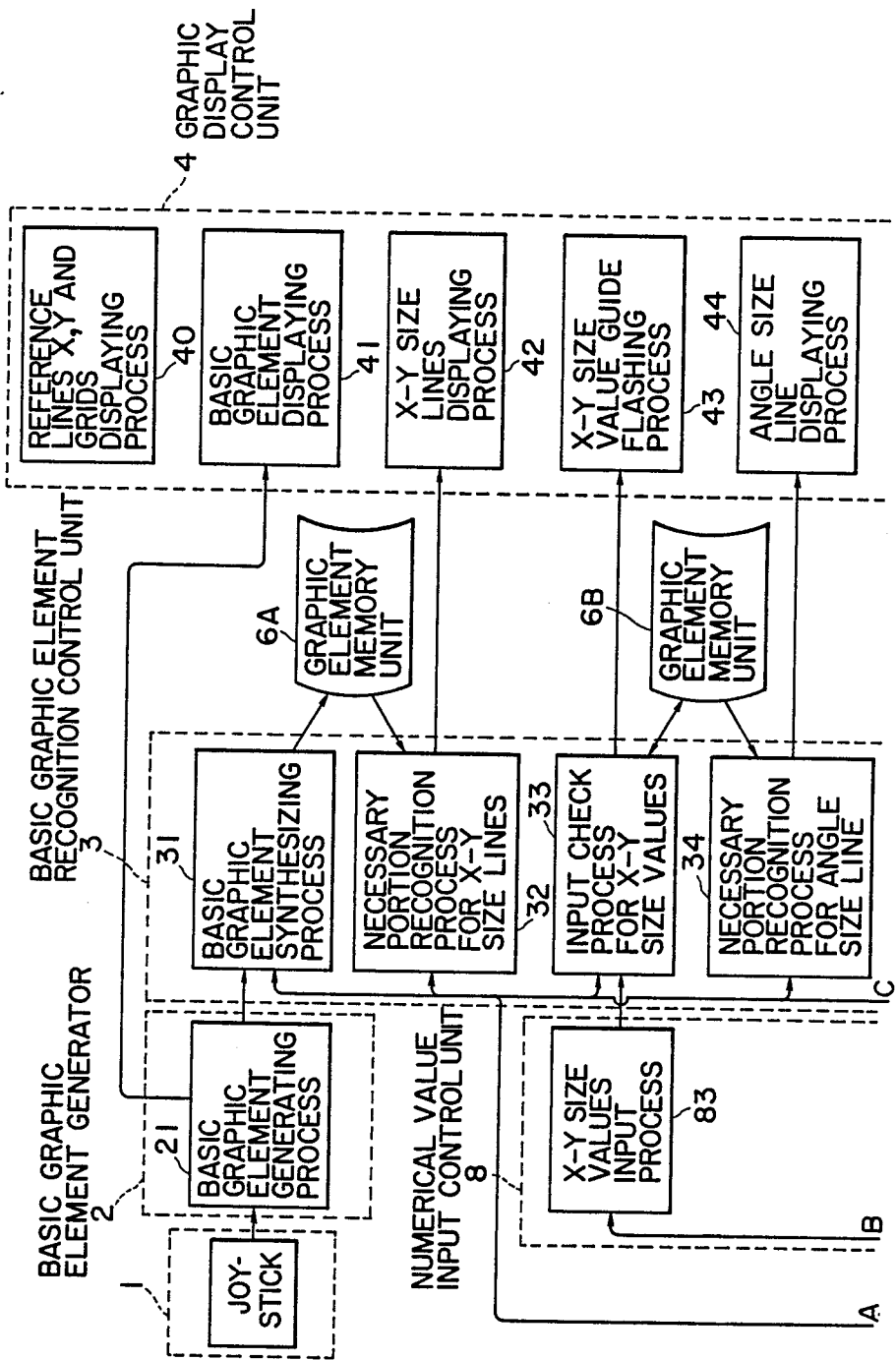

The basic graphic element generator 2, the basic graphic element recognition control unit 3, the graphic display control unit 4, the numerical value input control unit 8, the auxiliary graphic recognition control unit 9 and the graphic element row control unit 10 are respectively constructed by a microcomputer having a local memory, and the graphic element memory unit 6 is constructed as a common memory for the basic graphic element recognition control unit 3, the auxiliary graphic recognition control unit 9 and the graphic element row control unit 10. The units described above are connected to each other through a data bus and an address bus. In the whole apparatus, the control processes are transfered to ten processes comprising of the processes "0" through "9". FIGS. 8A and 8B show one example of the process in the respective units at the time interval of the processes "0" through "9", and the last numeral of the reference numerals in FIGS. 8A and 8B denotes the process number. Namely, for examle, the X-Y size line displaying process 42 denotes the process "2". The internal transition of the graphic element memory unit 6 which is used as the common memory is shown by the reference numerals 6A through 6D in FIGS. 8A and 8B.

Figure 3:
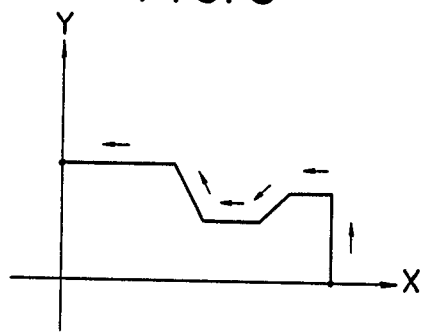
Figure 9:
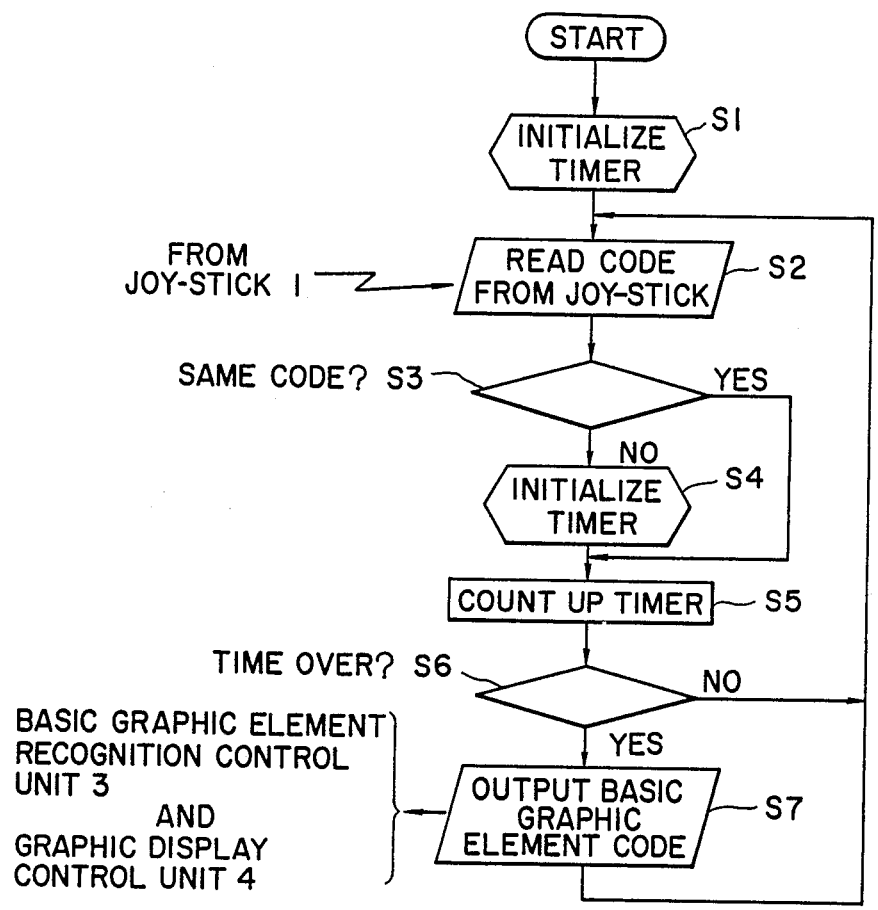
FIG. 9 is a flowchart showing the operation of the basic graphic element generator 2.
Figure 10:
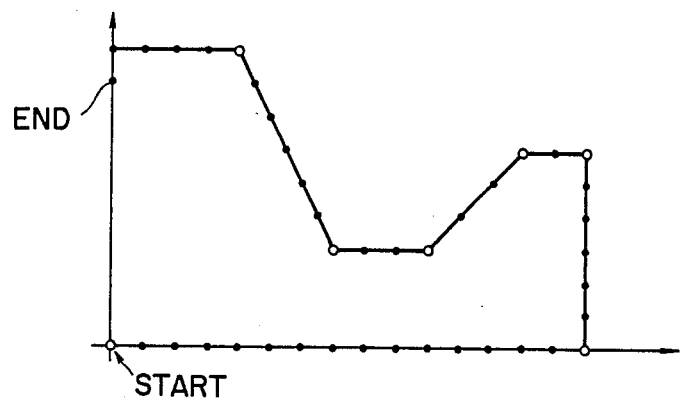
FIG. 10 is a graph showing one example of the basic graphic element code generated by the basic graphic element generator 2.

The operation of the basic graphic element generator 2 is shown in the flowchart of FIG. 9; a code signal from the joy-stick 1 is read out by the basic graphic element generator 2 and then the code signal as the basic graphic element code is transmitted to the basic graphic element recognition control unit 3 and the graphic display control unit 4 if the same code is read out over a constant period of time. An example of the basic graphic element code which is generator by the basic graphic generator 2 in order to form the shape shown in FIG. 3 is shown in FIG. 10. The kind of the basic graphic element code and the generating number thereof are shown in the table 1.

TABLE 1

| Generating Order | Basic Graphic Element Code Generated in the Process 21 | Basic Graphic Element Code Number Generated in the Process 21 |
|---|---|---|
| 1 | 13 | 15 |
| 2 | 1 | 6 |
| 3 | 5 | 2 |
| 4 | 7 | 3 |
| 5 | 5 | 3 |
| 6 | 2 | 6 |
| 7 | 5 | 4 |
| 8 | 9 | 1 |

Figure 11:
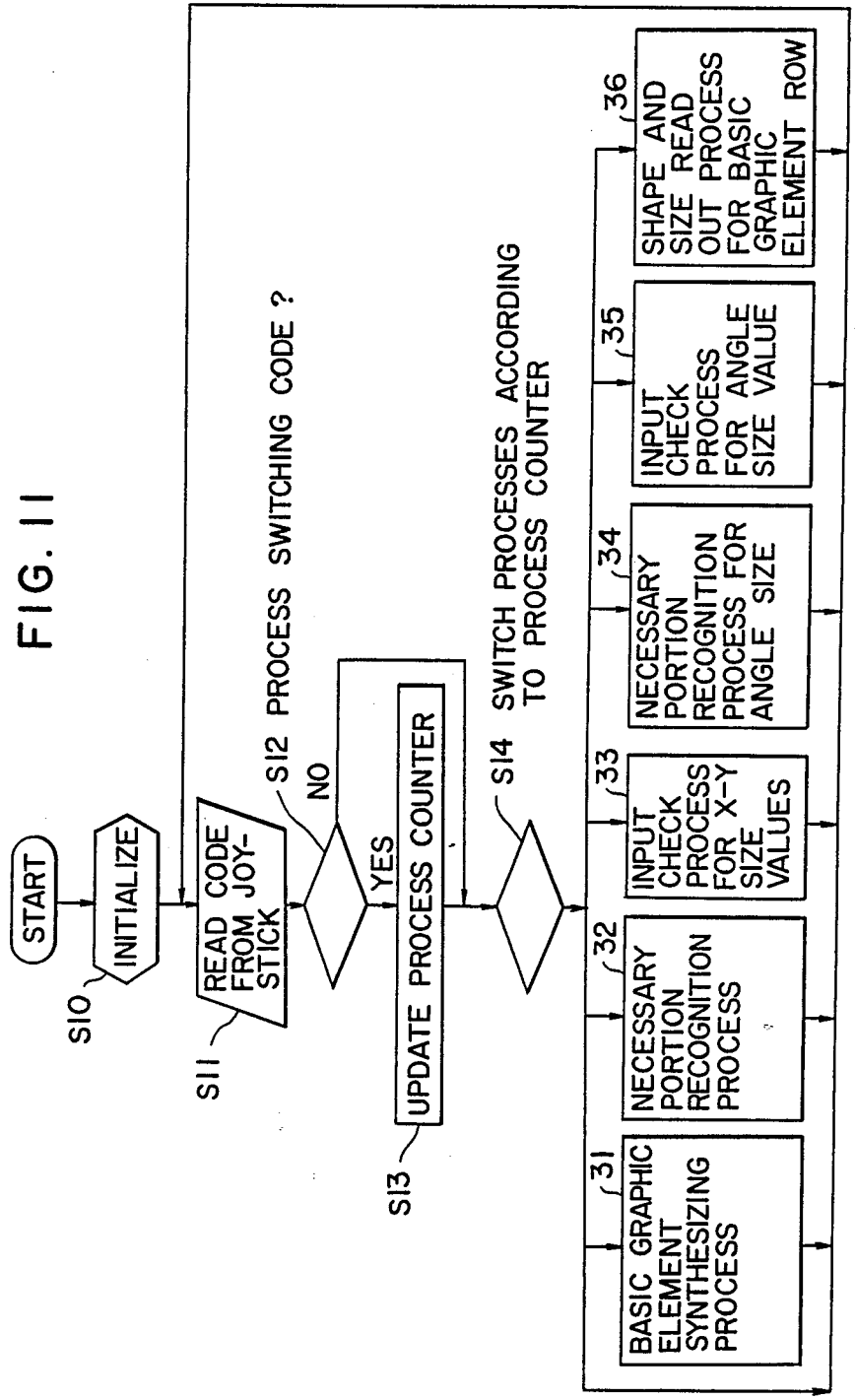
FIG. 11 is a flowchart showing the operation of the basic graphic element recognition control unit 3.

The basic graphic element recognition control unit 3 has the process controls 31 through 36 and the operation is shown in the flowchart of FIG. 11. At the step S14, the processes 31 through 36 are switched according to the process counter which corresponds to the code inputted from the keyboard 7. The basic graphic element code, which is generated from the basic graphic element generator 2, is received at the process 31, a data table, which has the same structure as the table 1, is then formed and the basic graphic element code is then stored in the graphic element memory unit 6. As a result, the graphic element memory unit 6 becomes as shown in the table 2.

TABLE 2

| Row Number | Graphic Element Shape | Graphic Element Size X | Graphic Element Size Y | Auxiliary Graphic Size R |
|---|---|---|---|---|
| 1 | 13 | 150 | 0 | empty |
| 2 | 1 | 150 | 55 | empty |
| 3 | 5 | 125 | 55 | empty |
| 4 | 7 | 105 | 35 | empty |
| 5 | 5 | 75 | 35 | empty |
| 6 | 2 | 46.132 | 85 | empty |
| 7 | 5 | 0 | 85 | empty |
| 8 | empty | empty | empty | empty |
| . | . | . | . | . |
| . | . | . | . | . |
| . | . | . | . | . |
| empty | empty | empty | empty | |

The process 32 outputs the row number, the discrimination of XY and the size number (L1 to L8) to the graphic display control unit 4 with the X-Y sizes displaying instructions so that the process 32 refers the column "empty" of the graphic element sizes X and Y in the table 2 and sequentially displays the respective size lines which lead to the X-size of the row number 2 from the last graphic element for example the Y-size of the row number 7.

The process 33 refers to the table 2 and outputs the size number L1 to the graphic display control unit 4 as well as the size value guide flashing instruction. Next, the process receives the numeral data from the numerical value input control unit 8 and stores it in the graphic element memory unit 6 if the sign and the dimensional relationship are all right. The process is sequentially repeated for the size numbers L2 to L8. The dimensional relationship denotes, for example L2<L3<L4<L5<L6<L8. When "?" is inputted from the keyboard 7, the code which represents "unclear" is stored in the corresponding column. Finally, the table 3 is formed.

TABLE 3

| Row Number | Graphic Element Shape | Graphic Element Size X | Graphic Element Size Y | Auxiliary Graphic Size R |
|---|---|---|---|---|
| 1 | 13 | 150 | 0 | empty |
| 2 | "C" | empty | empty | 1 |
| 3 | 5 | 150 | 55 | empty |
| 4 | 7 | 125 | 55 | empty |
| 5 | 5 | 105 | 35 | empty |
| 6 | "R" | empty | empty | 5 |
| 7 | 2 | 46.132 | 85 | empty |
| 8 | "R" | empty | empty | 5 |
| 9 | 5 | 0 | 85 | empty |
| 10 | empty | empty | empty | empty |
| . | . | . | . | . |
| . | . | . | . | . |
| | empty | empty | empty | empty |

The process 34 refers to the column "unclear" of the graphic element sizes X and Y in the table 3 and outputs the row number, XY discrimination and the size number with the angle size line displaying instruction to the graphic display control unit 4 if the column L2 is "unclear".

The process 35 also refers to the table 3 and outputs the size number A9 with the angle size value guide flashing instruction to the graphic display control unit 4 and then receives the numerical data from the numerical value input control unit 8. The process 35 calculates XY sizes values according to the angle values and stores them in the graphic element memory unit 6 if the sign and the dimensional relationship are all right. Finally, the table 4 is formed.

TABLE 4

| Row Number | Graphic Element Shape | Graphic Element Size X | Graphic Element Size Y | Auxiliary Graphic Size R |
|---|---|---|---|---|
| 1 | 13 | empty | 0 | empty |
| 2 | 1 | empty | empty | empty |
| 3 | 5 | empty | empty | empty |
| 4 | 7 | empty | empty | empty |
| 5 | 5 | empty | empty | empty |
| 6 | 2 | empty | empty | empty |
| 7 | 5 | 0 | empty | empty |
| 8 | empty | empty | empty | empty |
| . | . | . | . | . |
| . | . | . | . | . |
| empty | empty | empty | empty | |

The process 36 reads out the graphic element shape and the graphic element sizes X and Y from the table 4 in the graphic element memory unit 6 and outputs the precise basic graphic instruction to the graphic display control unit 4.

Figure 12:
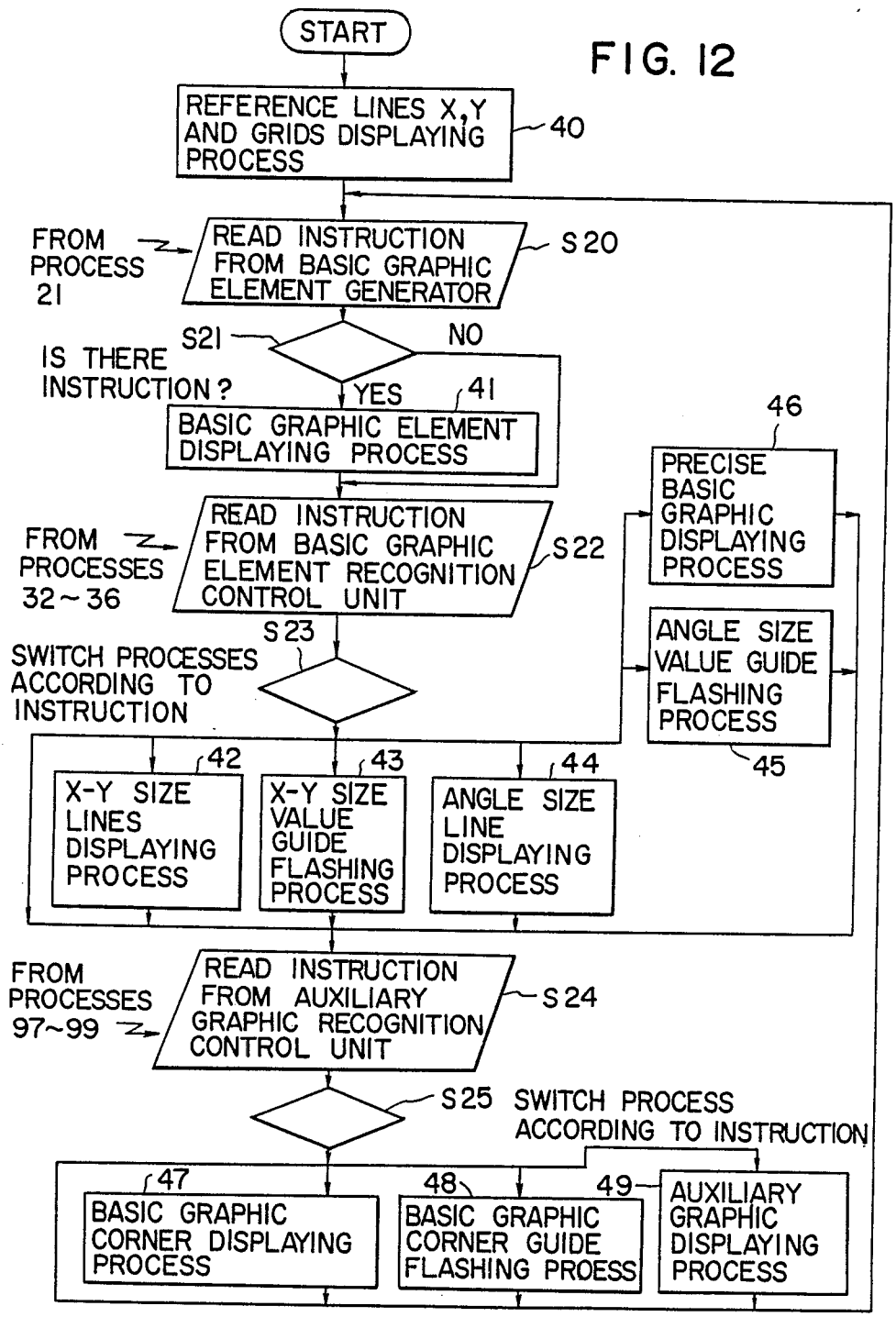
FIG. 12 is a flowchart showing the operation of the graphic display control unit 4.

The graphic display control unit 4 has ten processes 40 through 49. The reference lines X,Y and grids GR displaying process 40 is executed; the basic graphic element displaying process 41 is executed according to the instruction from the basic graphic element generator 2; the processes 42 through 46 are respectively executed according to the instructions from the basic graphic element recognition control unit 3 and the processes 47 through 49 are respectively executed according to the instructions from the auxiliary graphic recognition control unit 9. The operation of the graphic display control unit 4 is shown in the flowchart of FIG. 12, an example of the constant table in the graphic display control unit 4 is shown in the table 5 and an example of the control data table thereof is shown in the table 6.

TABLE 5

| Basic Graphic Element Code | Basic Graphic Element unit dot X | Basic Graphic Element unit dot X |
|---|---|---|
| 1 | 0 | 32 |
| 2 | −16 | 32 |
| 3 | −32 | 32 |
| 4 | −32 | 16 |
| 5 | −32 | 0 |
| 6 | −32 | −16 |
| 7 | −32 | −32 |
| 8 | −16 | −32 |
| 9 | 0 | −32 |
| 10 | 16 | −32 |
| 11 | 32 | −32 |
| 12 | 32 | −16 |
| 13 | 32 | 0 |
| 14 | 32 | 16 |
| 15 | 32 | 32 |
| 16 | 16 | 32 |

TABLE 6

| Row Number | Basic Graphic Element Code | Basic Graphic Element Code Counter | Basic Graphic Element Terminal dot X | Basic Graphic Element Terminal dot Y |
|---|---|---|---|---|
| 1 | 13 | 15 | 480 | 0 |
| 2 | 1 | 6 | 480 | 192 |
| 3 | 5 | 2 | 416 | 192 |
| 4 | 7 | 3 | 320 | 96 |
| 5 | 5 | 3 | 224 | 96 |
| 6 | 2 | 6 | 128 | 288 |
| 7 | 5 | 4 | 0 | 288 |

The process 40 displays the reference lines X and Y and grids GR at the predetermined position. It is possible to carry out the operation by dividing and storing the reference lines X and Y and the grids GR according to the respective line displaying instructions.

The process 41 receives the basic graphic element code from the basic graphic element generator 2, and converts the basic graphic element code to the respective line displaying instructions and outputs the instructions as well as forming the data table which has the structure of the table 6 according to the table 5 which is included in the graphic display control unit 4.

The process 42 calculates the position of the size line, the length thereof and so on from the basic graphic element terminal dots X and Y in the table 6 according to the XY size displaying instruction received from the basic graphic element recognition control unit 3, the row number, XY discrimination and the size numbers (L1 through L8). The process 42 then sequentially displays the size lines L1 through L8.

The process 43 sequentially flashes the size numbers L1 through L8 according to the size numbers and the size value guide flashing instructions received from the basic graphic element recognition control unit 3.

The process 44 calculates the position of the size line, the length thereof and so on from the basic graphic element terminal dots X and Y in the table 6 according to the angle size displaying instructions received from the basic graphic element recognition control unit 3, the row numbers, XY discrimination and the size number A9, and then displays the size line A9.

The process 45 flashes the angle size value guide according to the angle size value guide flashing instructions received from the basic graphic element recognition control unit 3 and the size number A9. The process 46 outputs a line displaying instruction according to the precise basic graphic instruction received from the basic graphic element recognition control unit 3.

The process 47 displays the basic graphic corners C1 through C6 at the basic graphic corner according to the basic graphic corner displaying instructions received from the basic graphic element recognition control unit 3, the graphic element sizes X and Y and the auxiliary graphic numbers C1 through C6. The process 48 flashes the basic graphic corner guides C1 through C6 according to the basic graphic corner guide flashing instructions received from the basic graphic element recognition control unit 3 and the auxiliary graphic numbers C1 through C6. The process 49 forms and outputs the line displaying instructions according to the auxiliary graphic displaying instruction, the auxiliary graphic shape code and the auxiliary graphic size R, which are received from the basic graphic element recognition control unit 3, and the before and after basic graphic element code and graphic element sizes X and Y.

The graphic element memory unit 6 has row numbers and has data columns of the graphic element shape, the graphic element sizes X and Y and the auxiliary graphic size R for each row number. The unit 6 has a code representing "empty" as the initial value. The tables 2, 3, 4 and 7 shows the contents in the graphic element memory unit 6 for respective processes.

TABLE 7

| Row Number | Graphic Element Shape | Graphic Element Size X | | Graphic Element Size Y | | Auxiliary Graphic Size R |
|---|---|---|---|---|---|---|
| 1 | 13 | (150) | (L8) | 0 | — | empty |
| 2 | 1 | 150 | L8 | (55) | (L7) | empty |
| 3 | 5 | 125 | L6 | 55 | L7 | empty |
| 4 | 7 | 105 | L5 | (35) | (L4) | empty |
| 5 | 5 | 75 | L3 | 35 | L4 | empty |
| 6 | 2 | unclear | L2 | (85) | (L1) | empty |
| 7 | 5 | 0 | — | 85 | L1 | empty |
| 8 | empty | empty | | empty | | empty |
| . | . | . | . | . | . | . |
| . | . | . | . | . | . | . |
| . | . | . | . | . | . | . |
| empty | empty | empty | | empty | | empty |

The numerical value input control unit 8 receives numerical codes, sign codes and decimal point code from the keyboard 7 and forms numerical data. Then, the unit 8 inputs the numerical data to the basic graphic element recognition control unit 3 and the auxiliary graphic recognition control unit 9. The processes 83, 85 and 88 are the same in construction.

The auxiliary graphic recognition control unit 9 has the processes 97 through 99, and switches the processes according to the process switching code from the keyboard 7. The operation of the auxiliary graphic recognition control unit 9 is shown in a flowchart of FIG. 13.

The process 97 refers the basic graphic element code, for example, columns 1 through 16, of the column for graphic element shape in the table 4, and inputs the graphic element sizes X and Y corresponding to the last column, for example, the row number 7, of the basic graphic element code and the auxiliary graphic numbers C1 through C6 to the graphic display control unit 4 as well as the basic graphic corner displaying instruction.

The process 98 also refers to the table 4 and inputs the auxiliary graphic number C1 to the graphic display control unit 4 as well as the basic graphic corner guide flashing instruction. Next, the process 98 receives the auxiliary graphic shape code or the auxiliary graphic absence code from the keyboard 7, and advances to the next step if the receiving code is the auxiliary graphic shape code, or goes back to the former step if the receiving code is the auxiliary graphic absence code, and then gives "C2" to the auxiliary graphic number. The process 98 receives the numerical data from the numerical value input control unit 8 when the auxiliary graphic code is inputted, and checks that the received numerical value is smaller than the length of the adjacent basic graphic, and inputs the auxiliary graphic shape code, the numerical code and the row number to the graphic element row control unit 10 if the checking is all right. The process is repeated until the number C6.

The process 99 refers the auxiliary graphic shape code, for example, "C" and "R", in the column of graphic element shape in the table 7, and inputs the graphic element shape of the pertinent and before and behind columns and the graphic element sizes X, Y and R to the graphic display control unit 4 as well as the auxiliary graphic displaying instruction.

The graphic element row control unit 10 removes the data of the graphic element memory unit 6 so that the next row of the row number is "empty" when the unit 10 receives the auxiliary graphic code and the numerical data from the auxiliary graphic recognition control unit 9. Thereafter, the unit 10 stores the numerical data in the column of graphic element shape and in the columns of auxiliary graphic code and auxiliary graphic size R which are changed to "empty". Finally, the table 7 is formed.

According to the system of this invention, since the shape inputting orders are in accord with the natural graphic recognition orders for an operator, the shape inputting operation is simplified and the time required for inputting the shape can be shortened.

It should be understood that many modifications and adaptations of the invention will become apparent to those skilled in the art and it is intended to encompass such obvious modifications and changes in the scope of the claims appended hereto.

What is claimed is:

1. A system for inputting a shape including working data of a workpiece for a machine tool in an automatic programming function comprising the steps of:

demanding input of basic graphics by an operator by displaying reference lines or grids on a graphic display unit through a graphic display control unit;

generating basic graphic elements by operating a joy-stick and inputting a series of basic graphic element groups by the operator in a manner corresponding to one stroke of a brush due to the generation of said basic graphic elements;

displaying basic graphics on said graphic display unit through said graphic display control unit by recognizing said basic graphic elements through a basic graphic element recognition control unit;

displaying size lines on said graphic display unit and demanding input of size values by the operator by recognizing necessary portions of said size values to determine said basic graphics through said basic graphic element recognition control unit and by transmitting said necessary portions to said graphic display control unit;

obtaining correspondences between said basic graphic elements and inputted size values and determining said basic graphics through said basic graphic element recognition control unit by inputting size values corresponding to said size lines;

reading out shapes and size of basic graphic element arrays of said determined basic graphics through said basic graphic element recognition control unit;

displaying precise basic graphics on said graphic display unit by transmitting said shapes and sizes of the basic graphic element arrays to said graphic display control unit;

demanding auxiliary input of corner portions by the operator by recognizing said corner portions of said basic graphics through an auxiliary graphic element recognition control unit;

inputting types and sizes of auxiliary graphics or information which indicates the absence of said auxiliary graphics; and repeating said reading out, displaying, transmitting, demanding and inputting processes for respective corner portions, whereby the types and the sizes of said auxiliary graphics are inserted into pertinent portions of said basic graphic element arrays which are formed with shapes and sizes and input of graphics.

2. A system according to claim 1, wherein values inputted as size values of said basic graphics are adopted as size values if they meet a predetermined criteria, and the operator is inserted to again input suitable size values if the values do not meet the predetermined criteria and the operator is instructed to input angle values if the size values represent a different predetermined criteria.

3. A system according to claim 1, wherein values inputted as size values of said auxiliary graphics are adapted as size values if they meet a predetermined criteria and the operator is instructed to again input suitable size values if the values do not meet the predetermined criteria.

* * * * *